July 29, 1924.

F. F. JAMES 1,503,437

APPARATUS FOR ATTACHMENT TO PHOTOGRAPHIC CAMERAS WHEREBY
PANORAMIC VIEW PHOTOGRAPHS CAN BE PRODUCED

Filed Nov. 27, 1923

4 Sheets-Sheet 1

Inventor
F. F. James
By Marks & Clerk
Attys

July 29, 1924.

F. F. JAMES 1,503,437

APPARATUS FOR ATTACHMENT TO PHOTOGRAPHIC CAMERAS WHEREBY
PANORAMIC VIEW PHOTOGRAPHS CAN BE PRODUCED

Filed Nov. 27, 1923

4 Sheets-Sheet 2

Inventor
F. F. James
By Marks & Clerk
Attys.

July 29, 1924.

F. F. JAMES

APPARATUS FOR ATTACHMENT TO PHOTOGRAPHIC CAMERAS WHEREBY
PANORAMIC VIEW PHOTOGRAPHS CAN BE PRODUCED

Filed Nov. 27, 1923     4 Sheets-Sheet 4

1,503,437

Inventor
F. F. James
By Marks & Clerk
Attys.

Patented July 29, 1924.

1,503,437

UNITED STATES PATENT OFFICE.

FRANK FREDERICK JAMES, OF KENSINGTON, NEAR SYDNEY, NEW SOUTH WALES, AUSTRALIA.

APPARATUS FOR ATTACHMENT TO PHOTOGRAPHIC CAMERAS WHEREBY PANORAMIC-VIEW PHOTOGRAPHS CAN BE PRODUCED.

Application filed November 27, 1923. Serial No. 677,315.

*To all whom it may concern:*

Be it known that FRANK FREDERICK JAMES, a subject of the King of Great Britain and Ireland, residing at 91 Dowling Street, Kensington, near Sydney, New South Wales, Commonwealth of Australia, has invented certain new and useful Apparatus for Attachment to Photographic Cameras Whereby Panoramic-View Photographs can be Produced, of which the following is a specification.

This invention relates to apparatus which is attachable to photographic cameras of known type to enable such cameras to be utilized for the purpose of producing photographs of panoramic views. The invention is applicable to those types of cameras in which a sensitized film is used as the medium upon which the panoramic view photographs are taken and from which prints may be reproduced in any well known manner. When the said apparatus is detached from the camera apparatus the latter may be used for taking photographs in the ordinary way upon replacing thereon the ordinary back of the camera.

Figure 1:
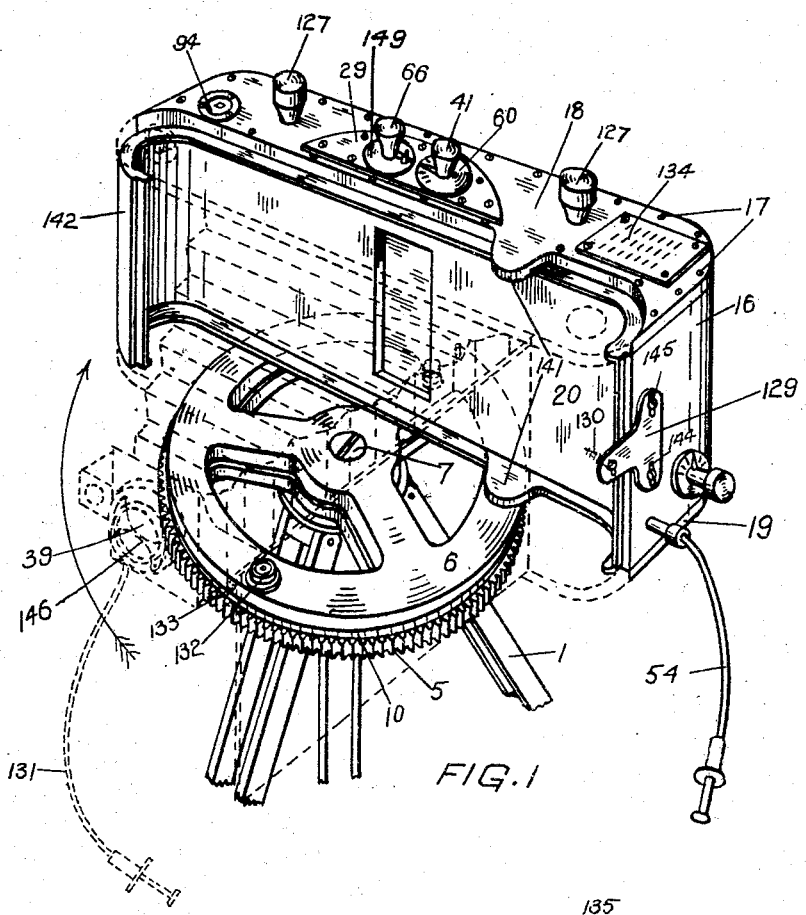
Figure 2:
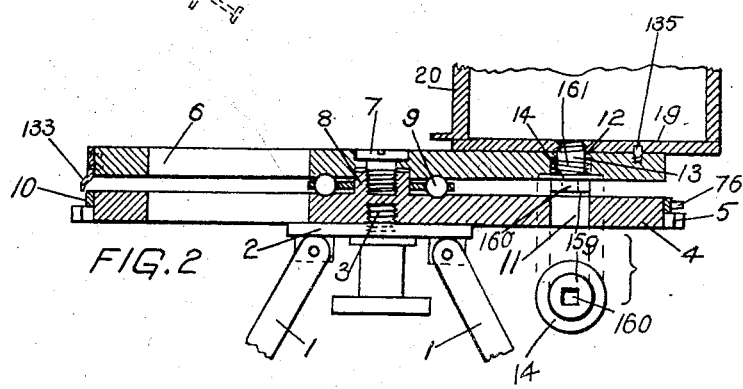
Figure 3:
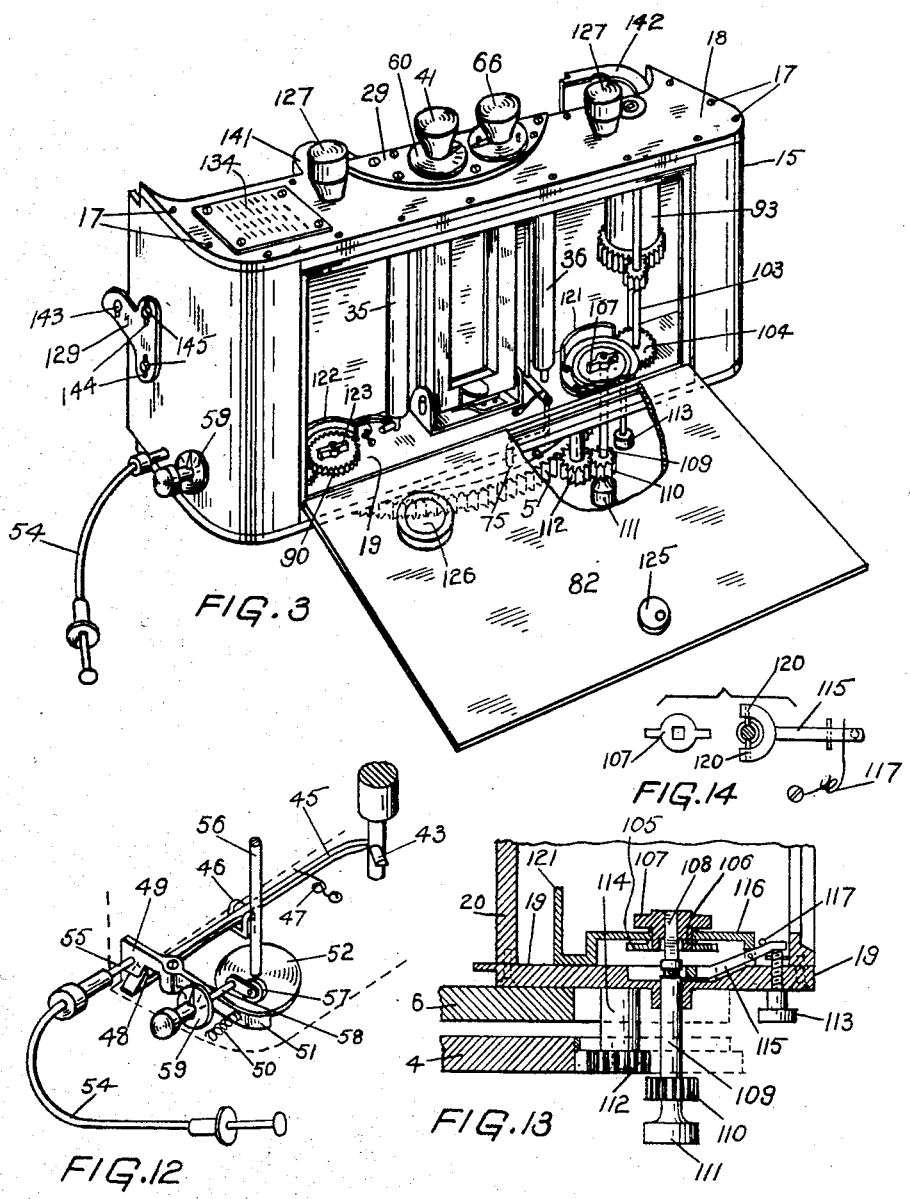
Figure 4:
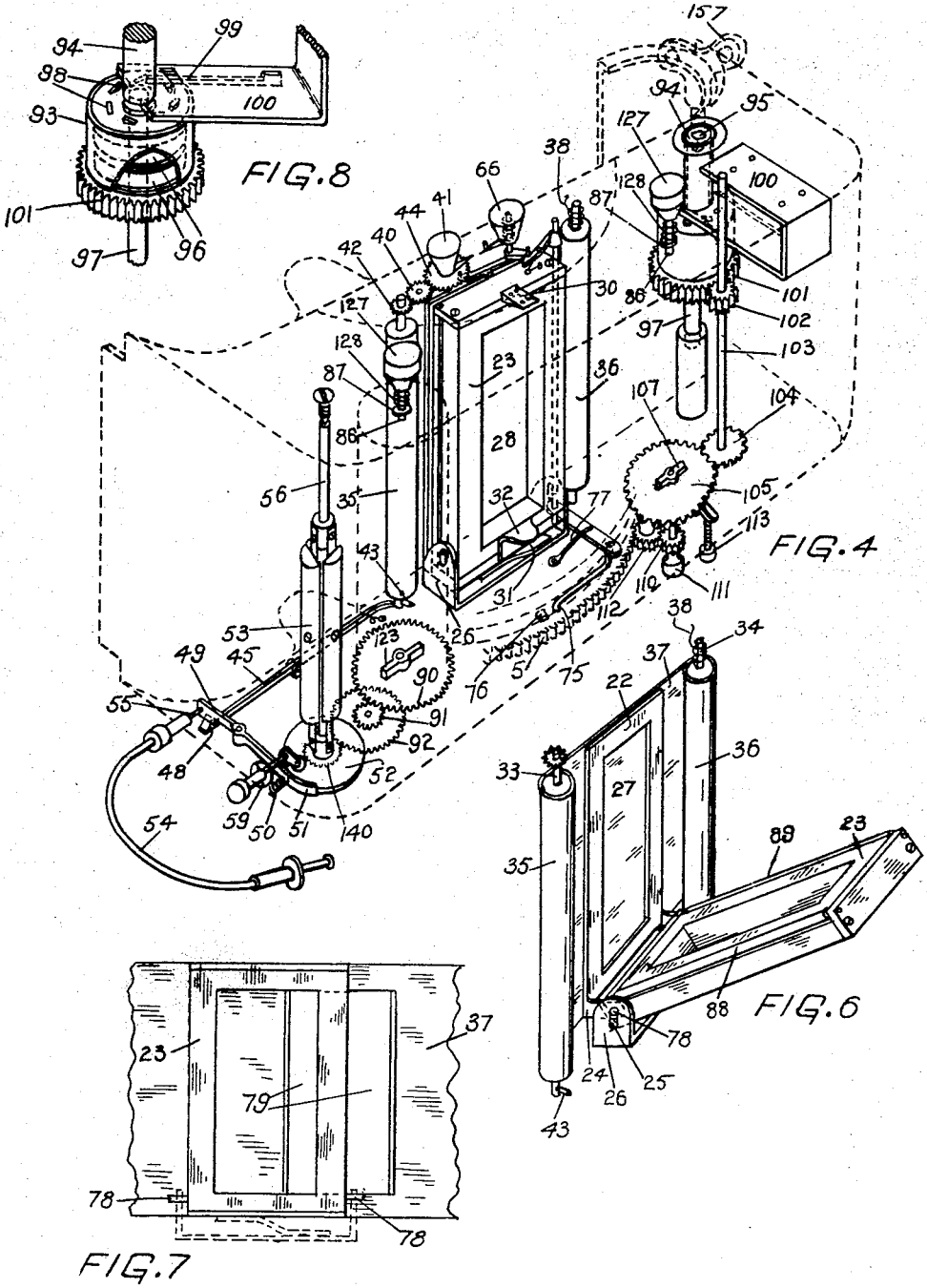
Figure 5:
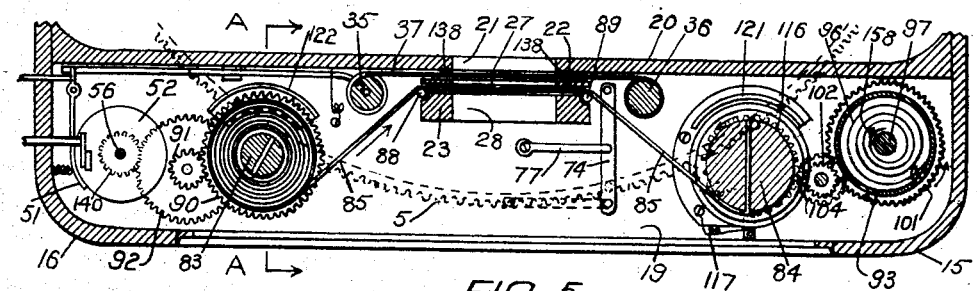
Figures 9, 10, 11:
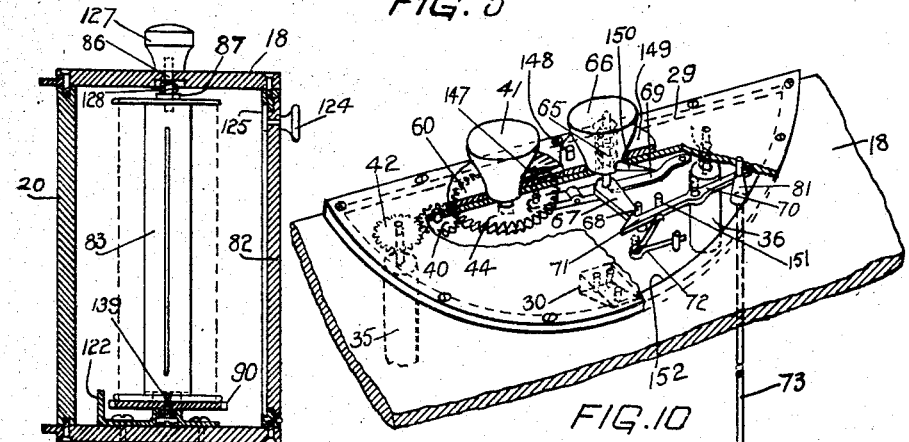

The invention is illustrated in the accompanying drawings in reference to one known type of camera in which Fig. 1 is a broken perspective view of the apparatus attached to a camera carried on a tripod; Fig. 2 a longitudinal broken sectional view with camera removed; Fig. 3 a rear perspective view partly in section of the housing of the apparatus with certain of the mechanism shown therein; Fig. 4 a diagrammatic view illustrating portions of the mechanism arranged in the casing; Fig. 5 a longitudinal section of the apparatus; Fig. 6 a detail view of a gate and blind shutter mechanism of the apparatus; Fig. 7 a detail view of the gate and blind shutter with openings therein; Fig. 8 a detail of a part of spring motor forming a component of the mechanism of the apparatus; Fig. 9 detail view showing one of the film carrying rollers; Figs. 10 and 11 detail views of mechanism for controlling setting of shutter blind and sensitized film; Fig. 12 detail view of mechanism for controlling movements of the apparatus through governor mechanism; Fig. 13 detail sectional view of mechanism for enabling the camera apparatus to be freely rotated independently of the mechanical operation of the operative integers of the panoramic view apparatus and also showing means for attachment of one of film spools thereto; Fig. 14 detail of part of the mechanism shown in Fig. 13; and Fig. 15 view illustrating means whereby the focusing scale of the camera is adjustable when the camera is to be used as a panoramic view camera or an ordinary camera.

A foldable tripod 1 of any suitable type is provided; such tripod carries at its head a plate 2 having therein an opening into which fits the screw 3 to which is rigidly attached the stationary circular spur rack 4 on whose periphery is a series of teeth 5. Located above the rack 4 is a rotatable plate 6, the latter being rotatable about the pivot screw 7 which fits a tapped opening in the boss 8 of the rack 4. A ball bearing 9 of any approved type is located between the rack 4 and the plate 6 and serves as an antifriction bearing for the plate 6. Situated about a shoulder on the rack 4 is a rotatable indicator band 10 upon which are a series of suitable markings one of which 136 indicates inches or parts thereof and the other 137 of which indicates degrees of a circle; the said indicator is freely rotatable on the rack 4. The object of the band 10 having thereon the two said series of markings is to give a ready indication of the amount of film used in taking any particular panoramic photographic view upon rotational movement of the camera apparatus.

There is an opening 11 in the rack 4 and in the plate 6 is an opening 12 through which projects the shank of the screw 13. Said screw is furnished with a shoulder 14 which fits a recess in the plate 6. The end of the screw 13 which projects beyond the upper face of the plate 6 is adapted to be secured to the bottom plate 19 of the housing for the mechanism of the apparatus through which panoramic view photographs may be produced. Upon unscrewing the screw 13 from the plate 19 the head of such screw projects into the opening 11 in the rack 4 and the plate 6 is thus prevented from rotating on the rack 4. Said housing may consist of separate end plates 15 and 16 secured by screws 17 to a top plate 18, a bottom plate 19, a front plate 20 and a hinged door 82. In the front plate 20 is an opening 21 associated with which is a gate 22 having a hinged frame 23 attached thereto, the latter is hinged to arms 24 extending from the gate 22 and carries the hinge pins 78 which slidably fit the elongated openings 25 in the bracket 26 which is attached to the bottom plate 19. There are openings 27 and 28 respectively in the gate 22 and the hinged frame 23. A pin 135 is carried in the plate 6 and is adapted to be brought into register with and to pass into a small opening in the bottom plate 19 whereby true adjustment may be made of the plate 19 with the rack 4 to enable the screw 13 to be readily placed in the opening 12 in the plate 19 and also to ensure that the pinion 112 will be brought into proper mesh with the teeth 5 of the rack 4. About the opening 21 interiorly of the front plate 20 and secured thereto is a frame 138 which is adapted to allow the blind shutter 37 to pass thereover so that light rays will not be likely to pass rearwardly of the shutter 37 during the traverse of the film 85 from the spool 83 to the spool 84.

In the top plate 18 is an opening 152 over which is secured the plate 29; said plate 29 carries a catch 30. Attached to the bracket 26 is a spring 31 which is normally adapted to keep the hinged frame 23 in locked engagement with the catch 30 when the said frame is closed to the gate 22. Upon depressing the finger push 32 on the frame 23 the spring 31 is depressed and the frame 23 is then slightly lowered and its head is disengaged from the catch 30 when the frame 23 may then be opened from the gate 22. Located on opposite sides of the gate 22 are the spindles 33 and 34 of the rollers 35 and 36 of the blind shutter 37. The said blind shutter has an opening 79 therein, the dimensions of which correspond with the dimensions of the openings 27 and 28 in the gate 22 and hinged frame 23. One end of a spring 38 is attached to the plate 29 and its other end is attached to the spindle 34 of the roller 36.

At its opposite ends the blind shutter 37 is secured to the rollers 35 and 36, but such blind shutter is wound on the roller 36 and may be unwound therefrom onto the roller 35 and vice versa. In Fig. 5 it will be seen that the shutter 37 is located between the front plate 20 and the gate 22 and that it passes across the opening 21 in the plate 20 and the openings in the gate 22 and hinged frame 23. Such openings may be in line with the lens of the camera 39 or may be out of line therewith. The plate 29 has rotatably mounted on a stub spindle carried thereby a spur pinion 40 which meshes with a spur wheel 44 attached to a turning knob 41 whose spindle is also mounted in the plate 29. Said pinion 40 also meshes with a spur pinion 42 on the head of the spindle 33 of the roller 35; the bottom of such spindle carries a projecting finger 43, adapted when the spindle 33 is turned by rotating the knob 41 and consequently the wheel 44, pinion 40, and pinion 42 to be brought into contact with the lever 45 which is pivoted to a bracket 46 on the bottom plate 19. The said lever 45 is normally held in downward position by means of the spring 47, but the end of the lever 45 with which the finger 43 may engage is capable of being lifted by said finger and when so lifted to release the tooth 48 on the said lever 45 from engagement with the lever 49 which is pivoted to the bottom plate 19 and is disposed approximately at right angles to the lever 45.

Normally the lever 49 is in engagement with the tooth 48 of the lever 45 in which event the spring 50 cannot force the bent end 51 of the lever 49 into frictional contact with the disc 52 of governor mechanism 53 of any appropriate type, but when the pin 43 contacts with the lever 45 and lifts same the lever 49 is disengaged from the tooth 48 and such lever 49 assumes the position thereof shown in Fig. 12 wherein the bent end 51 of the lever 49 is shown in engagement with the disc 52 of the governor mechanism 53 whereby the camera apparatus is thus prevented from rotating through the rotation of the plate 6 when the said governor mechanism is connected by means of a sensitized film 85 with spring motor mechanism to be hereafter described. When, however, the knob of the Bowden wire release 54 is operated the inner end 55 of such release forces the lever 49 into engagement with the tooth 48 of the lever 45 and the governor mechanism 53 is then free to act as the bent end 51 of the lever 49 is then out of engagement with the disc 52. The governor mechanism shown consists of plates pivotally suspended on collars one of which is fixed to the spindle 56 of the governor whilst the other is slidable on said spindle 56. As the speed of the spindle 56 increases the plates move outwardly and the speed of the spindle 56 is thus retarded. The speed of the spindle 56 may also be regulated by means of the brake shoe 57 carried on the inner end of the spindle 58 which passes through a plate 59 having markings thereon, the spindle 58 carrying a pointer which registers with the markings on the said plate to indicate the position of the brake shoe 57 in relation to the disc 52 of the governor mechanism.

The underface of the spur wheel 44 has a series of openings 61 therein and on the plate 60 surrounding the turning knob 41 are a series of indicator markings which register with the openings 61. On the knob 41 is a pointer 147 adapted to be rotated over the markings on the plate 60 and also to be set in register with any of the said markings for the purpose of indicating the amount of opening allowed in connection with the shutter 37. Pivoted to the bracket 62 on the plate 29 is the lever 63. One end of said lever carries a pin 64; its other end is loosely connected to the lower end of the bolt 65 to which is secured the press turning knob 66. Fixed to the bolt 65 is a lever 67 which carries a pin 68. A spring 69 serves to keep the lever 63 upwardly. There is a recess in the knob 66 and surrounding the bolt 65 is a coil spring 80, one end of which is attached to the bolt whilst the other end is connected to the plate 29. Pivoted to the plate 29 is the lever 70 having a tooth 71 at one end whose other end is normally kept in engagement by the spring 72 with the cone abutment 81 on the head of the rod 73 whose lower end is attached to a lever 74 which carries a downwardly projecting bent finger 75 part of which passes through an opening in the bottom plate 19. The lever 70 also abuts the stop pin 151 which also serves with the spring 72 to keep the lever 70 in contact with the cone abutment 81. Said finger is adapted to contact with a pin 76 projecting from the rotatable indicator band 10, after the latter has been set for the purpose of taking a panoramic photograph view on a piece of sensitized film of predetermined length measured by the setting of the said band 10 and projecting pin 76. A spring 77 serves to normally keep the lever 74 and rod 73 in downward position, but when the finger contacts with the pin 76 the rod 73 is raised and the lever 70 is moved sidewardly by the cone abutment 81. The lower end of the bent finger 75 is disposed in line with the centre line of the camera lens 39.

Said lever 67 is set in relation to the lever 70 by depressing the press turning knob 66 whereby the lever 67 is forced below the horizontal plane of the lever 70. The press handle 66 is then turned to turn the lever 67 and to place the pin 68 into engagement with the tooth 71 of the lever 70. Upon depressing the knob 66 the spring 80 is compressed and the spring 69 is also depressed to allow the lever 63 to be canted to permit the pin 64 on said lever to enter the particular opening of the series of openings 61 with which it may be in register. The amount of blind shutter opening 79 is thus fixed and the lever 70 is also set for engagement with the cone abutment 81 to allow for the determination of the length of sensitized film 85 to be used in the taking of the panoramic photographic view required. Upon the finger 75 striking the pin 76 the rod 73 is raised and the cone abutment 81 is also raised to trip the lever 70 from engagement with the pin 68 when the lever 67 is returned to normal position by the operation of the coil spring 80. It is not possible for the press knob 66 to return to upward normal position whilst the lever 67 is in engagement with the lever 70, but when the latter lever is moved out of engagement with the lever 67 the press knob 66 is then returned upwardly by the spring 69 which spring then also returns the lever 63 to normal position whereby the pin 64 will be withdrawn from the opening 61 in which it is situated. Unless the Bowden wire connection 54 is operated and until further resetting occurs of the knobs 41 and 66 and associated parts further movement of the sensitized film is prohibited as the governor mechanism 53 is prevented rotation by the tooth 48 on the lever 45 being out of engagement with the lever 49 whereby the bent end 51 of the lever 49 is allowed to frictionally contact with the governor disc 52. When the pin 64 is released from the opening 61 the blind shutter 37 returns to normal position on the roller 36 by the operation of the coil spring 38. Attached to the plate 29 is a plate 149 which carries a stop pin 148 adapted to limit the backward movement of the press knob 66, the said knob carrying a pin 150 which is adapted to contact with the pin 148.

Two spools 83 and 84 are provided to carry the sensitized film 85. Such spools are respectively mounted at their head on stub spindles 86 (see Fig. 9). Said stub spindles carry a collar 87 and a pull knob 127; the latter is carried exteriorly of the top plate 18 in which there is an opening to permit the spindles 86 to pass therethrough into the knob 127. Situated on the spindles 86 and abutting at their opposite ends the top plate 18 and the collar 87 is a coil spring 128. The movement of the film 85 is from the spool 83 to the spool 84 as shown by the arrows in Fig. 5. Carried on the hinged frame 23 are two rotatable rollers 88 and 89 and the film 85 is extended from the spool 83 over the roller 88, between the gate 22, hinged frame 23, over the roller 89 to the spool 84. Fixed to the plate 122 is a screwed stub spindle 130 upon which is rotatably mounted a spur wheel 90 which meshes with a spur pinion 91 rotatably carried on a fixed stub spindle attached to the bottom plate 19; the pinion 91 is formed integral with a spur wheel 92 also mounted on the said fixed stub spindle and the spur wheel 92 meshes with a spur pinion 140 on the spindle 56 of the governor mechanism 53.

A spring motor is furnished for rotating the camera apparatus. The barrel 93 of such motor is fixed to the spindle 94 which is provided with a square opening 95 to permit a key 157 to be inserted therein for the purpose of winding the coil spring or springs 96 of the motor. The key 157 may be utilized for fixing the screw 13 whereby the bottom plate 19 of the housing may be attached to the plate 6, the head 159 of the bolt 13 having a square opening 160 to allow the key 157 to be inserted therein.

Surrounding the shank of the screw 13 is a coil spring 161 and on the screw 13 is a shoulder 14 which fits a recess in the plate 6. In screwing the screw 13 into the bottom plate 19 the spring 161 is compressed and when said spring is unscrewed from the plate 19 the said spring pushes the head 159 of the screw 13 into the hole 11 of the rack 4. One end of the springs 96 is attached to the barrel 93 and the other end thereof is fixed to the spindle 97; the latter fits a recess in the spindle 94. At its head the barrel 93 is furnished with a number of teeth 98 with which engage a one-way pawl 99 carried on a bracket 100 attached to the top plate 18. Upon winding the springs 96 by turning the barrel 93 the spindle 97 is not rotated but the said springs are wound around the spindle 97; the motor cannot, however, operate until the bent end 51 of the lever 49 is out of frictional contact with the disc 52 of the governor mechanism 53. The spindle 97 carries a pin 158, which is adapted when the spindle 109 is being rotated to adjust the sensitized film 85 on the spools 83 and 84 through the sight opening 126, to be released from the spring 96 and the barrel 93 is therefore not rotated; during, however, the rotation of the barrel 93 by the key 157 to wind the spring 96 the pin 158 is in engagement with the said spring 96.

Fixed to the spindle 97 is the spur wheel 101 which is in mesh with the spur pinion 102 on the rotatable spindle 103 which is journalled in bearings on the top plate 18 and bottom plate 19. The spindle 103 also has attached thereto a spur wheel 104 which meshes with a spur wheel 105 fixed to the boss 106 of the catch 107 to which the lower end of the spool 84 is connectable. Such boss 106 is furnished with a square opening into which projects the squared end 108 of the spindle 109. Said spindle 109 has fixed thereto a spur pinion 110 and it is also fitted with a turning knob or button 111. The pinion 110 may be made to mesh with the spur pinion 112 or it may be moved out of mesh therewith by operating the adjusting screw 113. Such pinion 112 is fixed to a spindle 114 attached to the bottom plate 19 and it is in mesh with the teeth on the stationary circular spur rack 4.

The adjusting screw 113 fits a tapped opening in the bottom plate 19 and its inner end contacts with one end of the forked lever 115 which is pivotally carried by a plate 116. A spring 117 attached at one end to the bottom plate 19 bears at its other end against the lever 115 and tends to depress the outer end of such lever downwardly. There are oppositely disposed pins 120 in the lever 115. By moving the screw 113 inwardly in the bottom plate 19 its inner end is made to contact with the rear end of the lever 115 and such lever is then canted and the pins 120 in the forked end of the said lever depress the spindle 109 whereby the spur pinion 110 is placed out of mesh with the pinion 112. When, however, the pinion 110 is to be put into mesh with the pinion 112 the screw 113 is moved outwardly from the lever 115 and the spring 117 automatically raises the forward end of the lever 115 whereby the pins 120 serve to raise the spindle 109 and thereby bring the pinion 110 into mesh with the pinion 112.

At the rear of the plate 116 is an extension 121 which serves to enable the spool 84 to be set on the catch 107, and attached to the bottom plate 19 is a similar plate 122 for the spool 83. On the spur wheel 90 is a catch 123, similar to the catch 107, for the spool 83. The door 82 carries an operating knob 124 associated with a lock catch 125 whereby the said door may be opened from or locked to the frame of the housing. In the door 82 is a sight opening 126 which is usable for adjusting the sensitized film 85 on the spools 83 and 84.

After the back of the camera has been removed the camera may be attached to the housing for the panoramic view mechanism by means of the lugs 129 and 141 and the curved portion 142 of the end 15 the said lugs being respectively disposed on the end plate 16 and the top and bottom plates 18 and 19. The lug 129 is provided with a key-hole slot 143 and also with elongated slots 144; the slot 143 is adapted to receive a screw 130 which is attached to the side of the camera, the head of said screw being passed into the larger opening of the slot 143 in the first instance and the lug 129 moving on the screws 145 during the emplacement of the camera on the panoramic view apparatus whereby the camera is locked to such apparatus. Associated with the lens 39 of the camera is the usual shutter mechanism 146 operated by the Bowden-wire control 131. On the rotatable plate 6 is a spirit level 132 of any approved type by means of which the tripod 1 may be set to proper level for the purpose of enabling the camera apparatus to be utilized for taking panoramic view photographs. The plate 6 may also carry on its periphery a pointer 133 adapted to be set when required in register with any of the markings 136 or 137 on the indicator band 10. The top plate 18 may have mounted thereon a plate having markings 134 thereon giving particulars of the comparative values of the shutter opening and the movement of the film 85 in relation to the rotational movement of the camera apparatus, the resultant of which values gives the correct exposure values of any panoramic view photographs taken by means of the apparatus.

Figure 15:
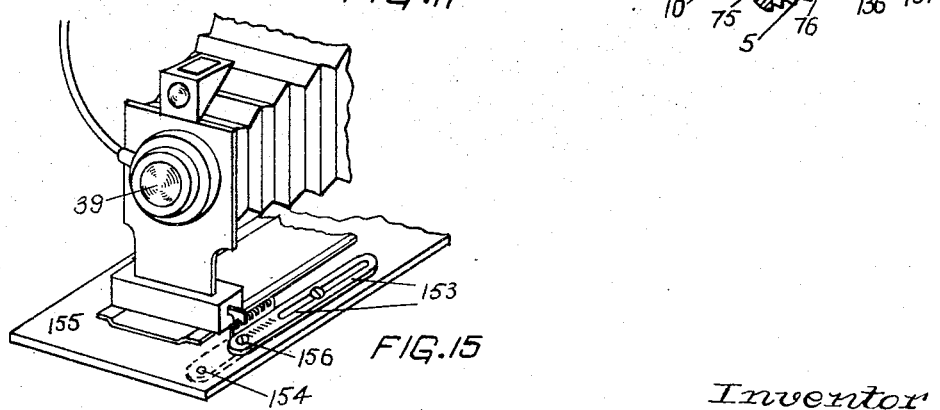

As the distance of the sensitized film 85 will be farther rearwardly of the lens 39 of the camera when the panoramic photographic view apparatus is attached to the camera it is necessary to alter the focusing mechanism 153 by transferring same from a point 154 on the base board 155 to the point 156 shown in Fig. 15. When, however, the camera is to be used for taking photographs without the panoramic view apparatus having been attached thereto the focusing mechanism 153 is readjusted in relation to the point 154.

In operation when the camera apparatus has been fixed on the housing of the panoramic view apparatus and the conjoint apparatus has been fixed to the tripod 1 by means of the screw 3, the sensitized film 85 carried by the supply spool 83 is placed in the housing for the panoramic view apparatus. Upon attaching the conjoint apparatus on the tripod 1 it is necessary that the spur pinion 110 be out of mesh with the spur pinion 112. The free end of the film 85 is then passed to the feed spool 84 therefor when such spool has also been placed in such housing. In fixing the film 85 in relation to the spool 84 it is necessary to detach the hinged frame 23 from the gate 22 and to pass the film between the gate 22 and the frame 23. The hinged frame 23 is then again locked to the gate 22. The door 82 is then closed and on turning the knob 111 the spool 84 is turned to wind thereon part of the paper attachment of the sensitized film 85 until the film or the attached paper is unwound from spool 83 and the first marking of the film is brought to view through the sight opening 126 in door 82. During the rotation of the spool 84 by operating the spindle 109 the spindle 97 is freely rotated but the barrel 93 remains stationary. The said rotation of the spool 84, however, permits the pin 158 in the spindle 97 to become disengaged from the spring 96. Before the spools 83 and 84 are placed in the housing the governor mechanism 53 is released by operating the Bowden-wire control 54.

The panoramic view camera apparatus is then turned on the tripod 1 (the pinion 112 in such movement being in engagement with the teeth 5 of the stationary rack 4) to ascertain the angular movement through which such apparatus must travel to obtain the particular panoramic view to be photographed. Before such movement is made the pin 76 on the band 10 is brought into line with the axial centre of the camera lens 39 when the finger 75 will also be in line with the said pin 76. The pin 76 is disposed on the zero line of the degree scale 137 on the band 10. Upon angular movement of the camera apparatus having been effected to the desired extent the finger 75 will register with one of the degree markings 137 on the band 10 other than the zero marking on such band and such degree marking can then be read. After the camera apparatus has been returned to normal zero position in relation to the pin 76 on the band 10 the screw 113 is adjusted to adjust the spindle 109 for the purpose of bringing pinion 110 into mesh with pinion 112. The band 10 is then moved on the stationary rack 4, so that the pin 76 will be moved therewith until the pin 75 is brought into register with the particular degree 137 at which the camera apparatus is to be stopped in travel in taking the panoramic photographic view desired. Before, however, the pin 76 is so adjusted the blind shutter 37 is adjusted by means of the knob 41 and its associated parts and the governor mechanism in such latter adjustment is locked by means of the operation of the levers 45 and 49. Adjustment of the knob 66 and associated parts is then made to lock the knob 41 in position.

After the said adjustments have been made the springs 96 of the spring motor are wound on the spindle 97 whereby power is communicated to such motor. Upon pressing the Bowden-wire controls 54 and 131 simultaneously the shutter 146 of the camera is opened and the camera panoramic view apparatus is allowed to rotate through the governor mechanism having been released by the operation of the Bowden-wire control 54 until the pin 75 contacts with the pin 76 on the band 10 when the rod 73 is raised and the cone abutment 81 operates the lever 70 to trip same and to allow the knobs 41 and 66 and associated parts to return to normal position, the lever 49 being simultaneously operated to brake the governor mechanism 53 and so prevent further movement of the camera panoramic view apparatus and the sensitized film 85. In rotating, the camera panoramic view apparatus moves clockwise as indicated by the arrow in Fig. 1.

It will be understood that the tripod 1 is suitably levelled by means of the spirit level 132 and that proper readings will be made as regards shutter opening and otherwise obtainable by reference to the indicator plate 134 before the panoramic view photographs are taken. The pointer 133 may be dispensed with but if used it is preferable to locate it on the plate 6 so that when the camera is arranged thereon such pointer will coincide with the disposition of the pin 75 in relation to the centre of the lens 39 of the camera.

What I claim as my invention and desire to secure by Letters Patent is:—

1. A panoramic photographic camera comprising an adjustable stand, a stationary circular rack on said stand, a rotatable plate on said rack, a housing on said plate, a light tight camera chamber fitted with a lens and shutter detachably secured to said housing, a rotatable scale on the periphery of said rack, a pair of spools for carrying a sensitized film one of which is adapted to receive the said film after exposure thereof through an opening in the front wall of said housing, an adjustable shutter with opening therein in said housing disposed forwardly of said screen, a gate with opening therein associated with said housing opening, a hinged frame with opening therein connected to said gate, the said gate and hinged frame being adapted to receive therebetween the said film in its passage from one spool to the other thereof, means for adjusting the opening in said shutter in relation to the openings in said gate and hinged frame, a spring motor in said housing, gear means connecting said motor with said rack and the receiving spool for said exposed film, gear means connecting the other said spool to governor mechanism, means for manually releasing said governor mechanism, manual means for operating said lens shutter, means whereby the governor mechanism is operated to prevent operation of said motor upon the said plate and parts carried thereon having passed through a predetermined angular movement, means on said housing for adjusting the said film on said spools, and means associated with said housing and said scale whereby the field of travel of the said lens in photographing panoramic objects is predetermined.

2. In a panoramic photographic camera, a housing to which a light tight camera chamber carrying a lens associated with a controllable shutter is fitted, a hinged door attached to said housing, a sight opening in said door, a frame surrounding an opening in the front wall of said chamber, an adjustable shutter associated with said frame the latter being adapted to prevent light rays passing rearwardly of said shutter, a circular rack on which said housing is mounted, spools carrying a sensitized film in said housing, a hinged frame and gate between said spools through which said film passes from one spool to the other, controllable means for enabling rotation of such housing and camera chamber, a circular indicator and measuring band, means co-operating with said band to give indications and measurement of circular travel of said housing and camera chamber, and means associated with said band and housing whereby circular travel of said housing and chamber is stopped at predetermined measurement.

3. In a panoramic photographic camera, a housing, a spring motor, gear means between said motor and a receiving spool for an exposed sensitized film, a feed spool carrying said film one end of the latter being connected to the said receiving spool, gear means connecting said feed spool to governor mechanism for said motor, a shutter having an opening therein arranged over an opening in the front wall of said housing in association with said film, means for adjusting the amount of opening of said shutter, means associated with said shutter whereby said governor mechanism is locked in the setting of said shutter, and means for unlocking said governor mechanism.

4. In a panoramic photographic camera, a housing, governor mechanism for a spring motor in such housing, gear means connecting said motor with said governor mechanism, spools carrying a sensitized film gear connected to said gear means, an adjustable light controlling shutter over an opening in said housing carried on rollers, a pin on the spindle of one of said rollers, a tiltable lever pivoted to the foot of said housing having a tooth at one end, a governor control lever also pivoted to the foot of said housing and arranged in association with said tiltable lever, a spring controlling said governor lever, means for setting said shutter and during said setting to operate said tiltable lever to allow said spring to operate said governor lever to lock said governor mechanism, and means for unlocking said governor mechanism by operating said governor lever.

5. In a panoramic photographic camera, a stationary circular rack adapted to be secured to an adjustable tripod, a rotatable measuring band on said rack, a guide and trip projection on said band, a rotatable plate supported on said rack, a steady pin on said plate to enable a housing to be readily erected for operation on said plate, and an adjustable screw adapted to secure said housing to said plate and when said housing is detached from said plate to serve for locking said rack and plate against rotation in relation to each other.

6. In a panoramic photographic camera, a gate adapted to be secured over an opening in the front wall of a housing said gate having an opening therein, a frame with an opening hinged to said gate, a bracket in said housing carrying a depressable spring, a finger push on the lower end of said frame, and a stop catch on the head of said housing adapted to hold said frame against said gate until pressure is applied to said finger push to depress said spring to allow said frame to be released from said catch.

7. In a panoramic photographic camera, a housing, a plate on the head of said housing, a rotatable knob carried on a spindle rotatable in said plate, a gear wheel fixed on said spindle, and having a series of openings in its underface, gear means connecting said gear wheel with the spindle of one roller of a pair of rollers carrying an adjustable light controlling shutter, a lever carrying a pin at one end pivoted to said plate, a bolt loosely connected to the other end of said lever and passing through said plate, a rotatable press knob having a recess on said bolt, a compressible coil spring surrounding said bolt in said recess having its opposite ends attached respectively to said bolt and plate, a lever fixed to the said bolt carrying a pin at its free end, a leaf spring normally pressing said bolt and pivoted lever upwardly, a one toothed lever pivoted to said plate, a spring adapted to normally press said one toothed lever against a stop pin and a projection on a rod having a cone abutment thereon, a pin associated with said rod adapted when brought into contact with a set stop to raise said rod and the abutment thereon to operate the one toothed lever and thereby place it out of engagement with the pin on the said lever attached to said bolt after said pin has been set into engagement with the said one toothed lever by operating the said rotatable press knob, and spring means associated with the spindle of the other roller of said adjustable shutter whereby said shutter is closed after the opening thereof by turning said rotatable knob and operation of the said one toothed lever has been effected.

8. In a panoramic photographic camera, a rotatable housing, a circular stationary rack carried on an adjustable support, spring motor means in said housing, gear means connecting said motor with a pair of spools carrying a sensitized film and governor mechanism, a spindle associated with the spool on which the exposed sensitized film is received, a gear wheel on said spindle, a gear wheel on said housing in constant mesh with the teeth of said rack, a turning knob on said spindle, a pivoted lever associated with said spindle, a spring normally tending to depress one end of said lever to raise said spindle, and an adjustable screw fitting the bottom of said housing adapted to raise the said end of said spring to lower the said spindle when it is desired to place the gear wheel thereon out of mesh with the gear wheel in constant mesh with the teeth of said rack.

9. In a panoramic photographic camera a rotatable measuring band having markings thereon whereby the setting and angular travel of said camera is gaugeable by means of a pointer carried by said camera, and a projection on said band adapted when said pointer is brought into contact therewith to allow means associated with said pointer to be operated for the purpose of stopping the angular travel of said camera.

10. In a panoramic photographic camera, a housing, a spool for receiving an exposed sensitized film, an adjustable spindle associated with a catch through which said spindle is fixed to said spool, a gear wheel on said spindle in constant mesh with a gear wheel on a spindle which is gear connected to a spring motor, a gear wheel on said spindle which is capable of being meshed with or unmeshed from a gear wheel on said housing, a turning knob on said spindle, a circular stationary rack with teeth on its periphery in constant mesh with the gear wheel on said housing, a barrel for said spring motor carried on a separate spindle adapted to be turned by a key to wind the said motor without rotating the said gears, and means for preventing unwinding of said spring motor whilst allowing the barrel thereof to be turned in one direction only.

In testimony whereof I affix my signature.

FRANK FREDERICK JAMES.